United States Patent
Berrak et al.

(10) Patent No.: US 7,462,287 B2
(45) Date of Patent: Dec. 9, 2008

(54) APPARATUS AND PROCESS FOR TREATING EFFLUENTS

(75) Inventors: Abderrazak Berrak, Sherbrooke (CA); Dermoune Abderrahmane, Sherbrooke (CA)

(73) Assignee: Les Technologies Elcotech Inc., Sherbrooke, Quebec (CA)

( * ) Notice: Subject to any disclaimer, the term of this patent is extended or adjusted under 35 U.S.C. 154(b) by 441 days.

(21) Appl. No.: 11/127,189

(22) Filed: May 12, 2005

(65) Prior Publication Data

US 2005/0230321 A1    Oct. 20, 2005

Related U.S. Application Data

(63) Continuation-in-part of application No. PCT/CA03/01882, filed on Dec. 1, 2003.

(30) Foreign Application Priority Data

Nov. 29, 2002  (CA) .................................. 2412542
Mar. 18, 2003  (CA) .................................. 2423213

(51) Int. Cl.
   *C02F 1/46*    (2006.01)
(52) U.S. Cl. ..................................... 210/748
(58) Field of Classification Search ................ 210/748, 210/243, 717, 400; 204/627, 553, 649; 205/742, 205/758
   See application file for complete search history.

(56) References Cited

U.S. PATENT DOCUMENTS

| | | | |
|---|---|---|---|
| 3,898,150 A | | 8/1975 | Russell et al. |
| 4,244,804 A | | 1/1981 | Moeglich et al. |
| 4,331,525 A | * | 5/1982 | Huba et al. ............... 210/650 |
| 4,376,022 A | | 3/1983 | Porta et al. |
| 4,481,114 A | * | 11/1984 | Riise ........................ 210/702 |
| 4,551,246 A | | 11/1985 | Coffing |
| 4,732,661 A | | 3/1988 | Wright |

(Continued)

FOREIGN PATENT DOCUMENTS

CA       2179476      12/1997

(Continued)

OTHER PUBLICATIONS

English Abstract of CN 1485282A, published on Mar. 3, 2004.

(Continued)

*Primary Examiner*—Duane Smith
*Assistant Examiner*—Cameron J Allen (57) ABSTRACT

A process allowing treatment of effluents. The process comprises the following steps: (a) providing a reactor comprising an inlet, an outlet, at least one block of electrodes comprising at least one anode and at least one cathode. The effluent to be treated is run between the electrodes in an upward direction; and (b) allowing the effluent to be treated to run between the electrodes of the at least one block in an upward direction so as to submit the effluent to an electrical current and thereby treating the effluent by electrocoagulation and/or electroflotation. There is thus produced a sludge containing at least one pollutant that is comprised in the effluent to be treated, and a treated effluent. The produced sludge is thereafter separated from the treated effluent. There is also provided an apparatus allowing implementation of this process. The process and the apparatus make it possible to efficiently treat effluents of various compositions and that may contain a wide range of contaminants.

22 Claims, 5 Drawing Sheets

U.S. PATENT DOCUMENTS

| | | | |
|---|---|---|---|
| 4,861,496 A | * | 8/1989 | Diaz .................. 210/748 |
| 4,877,503 A | | 10/1989 | Candor |
| 5,019,230 A | | 5/1991 | Candor |
| 5,362,371 A | | 11/1994 | Candor et al. |
| 5,401,375 A | | 3/1995 | Yamaguchi et al. |
| 5,922,209 A | | 7/1999 | Yoshida et al. |
| 6,871,744 B2 | | 11/2001 | Miller et al. |
| 2005/0016870 A1 | | 1/2005 | Berrak et al. |
| 2005/0199499 A1 | | 9/2005 | Berrak et al. |

FOREIGN PATENT DOCUMENTS

| | | | |
|---|---|---|---|
| JP | 10-099887 | * | 4/1998 |
| RU | 1813727 A1 | * | 5/1993 |

OTHER PUBLICATIONS

English Abstract of JP 56002817A, published on Jan. 13, 1981.
English Abstract of JP 63264200A, published on Nov. 1, 1988.
FR 2 735 793 "Dispositif de Traitement Electrolytique des Effluents" (Debillemont Paul—Be and Manzi Amalia—FR) Jun. 26, 1995.
FR 2 751 637 "Cellule d'Electrocoagulation pour le Traitement d'Effluents" (Pofimar Societe a Responsabilite Limitee—FR) Jul. 29, 1996.
EP 1 174 394 A2 "Verfahren und Vorrichtung zur Reinigung von Abwässen" (Ader Abwasser Anlagen AG 76646 Bruchsal—DE) Jul. 17, 2001.

* cited by examiner

FIG_1

FIG_4

APPARATUS AND PROCESS FOR TREATING EFFLUENTS

CROSS-REFERENCE TO RELATED APPLICATION

The present application is a continuation-in-part of International Patent Application No. PCT/CA03/001882 filed on Dec. 1, 2003, which claims priority on Canadian Patent Application No. 2,412,542 filed on Nov. 29, 2002, and on Canadian Patent Application No. 2,423,213 filed on Mar. 18, 2003. The above-mentioned applications are incorporated herein by reference in their entirety.

FIELD OF THE INVENTION

The present invention relates to the field of electrochemistry as applied to the treatment of effluents. In particular, the invention concerns an apparatus and a process for treating effluents.

PRIOR ART

In view of relatively recent concerns of the community with respect to pollution, the industry was forced to develop innovating means making it possible to be in conformity with environmental regulations. Electrocoagulation has therefore reappeared as a viable technology.

Electrocoagulation is a process based on scientific principles in which contaminants from the effluent are treated with strong electrical fields, thus inducing oxidation and reduction reactions. This process can remove more than 99 percent of certain heavy metal cations. In addition, the electrical field that is applied makes it possible, under certain conditions, to obtain a bactericidal effect. The process also permits to precipitate charged colloids and to remove important quantities of other ions, colloids and emulsions.

Although the electrocoagulation mechanism is much like that involving chemical coagulation, the cationic species that are responsible for neutralizing the surface of the charges and the characteristics of the electrocoagulated flocs differ in each of these processes. An electrocoagulated floc has a tendency to contain less bound water, it is more resistant against shearing and can be more easily filtered. Electrocoagulation is often capable of neutralizing ions and particle charges, thus allowing contaminants and polluting material to precipitate. It is thus possible to reduce the contaminant content to concentrations lower than those that can be reached via chemical precipitation processes. At the same time, it is sometimes possible to replace and/or to reduce the use of costly chemical agents such as polymers or metallic salts.

United States Application published under number 2002/0040855 describes a process in which water is treated by electrocoagulation. On the other hand, in this process, the sludge must be treated in a clarifier or a settling basin and this process sometimes requires the use of flocculants.

U.S. Pat. No. 6,448,835 describes a process for treating liquids by electrocoagulation. After this treatment, the electrolytic liquid may be run through a development chamber where the liquid may be treated with additives. Alternately, the electrolytic liquid may undergo a secondary treatment of separation in order to proceed to a solid/liquid separation. This separation may be carried out with purifiers, filters, centrifugal separators or centrifuges. Each of these devices may be used separately or in combination.

United States Application published under number 2003/0070919 describes an electrocoagulation reactor comprising electrodes defining openings allowing the liquid to pass from one zone to the other in a stack of electrodes. Two types of electrodes are used, some of them having a central opening and others each comprising a plurality of peripheral openings. These two types of electrodes alternate in the stack of electrodes. Such an arrangement is selected so as to produce a turbulent flow of liquid, which helps self-cleaning of the electrodes. On the other hand, water that has been treated then rests in a development tank where flocs are produced. A static mixer is provided where polymers are also used to increase formation of flocs and decantation.

SUMMARY OF THE INVENTION

The present invention aims at providing a process allowing treatment of effluents while mitigating the drawbacks of the techniques mentioned above.

Another aim of the invention is to provide a simple process in which the sludge that is produced following treatment of the effluent with an electrical current could easily be separated from the treated effluent.

The present invention also aims at providing an apparatus allowing treatment of effluents while mitigating the drawbacks of the techniques mentioned above.

Another aim of the invention is to provide a simple apparatus by means of which it is easy to separate the sludge produced from the treated effluent and this, without having to rely on flocculating agents or complex mechanical means.

According to a first aspect, the invention concerns a process for treating effluents, characterized in that:
  a) there is provided a reactor comprising an inlet, an outlet, at least one block of electrodes comprising at least one anode and at least one cathode, and means allowing the effluent to be treated to circulate between the electrodes in upward direction; and
  b) the effluent to be treated is run upwardly between the electrodes of the at least one block so as to subject the effluent to an electrical current thereby treating the effluent by electrocoagulation and/or electroflotation, and thus producing a sludge containing at least one pollutant that is comprised in the effluent to be treated, and a treated effluent, and in that the sludge that is produced is separated from the treated effluent.

According to a second aspect, the invention concerns a process for treating effluents characterized in that:
  a) there is provided a reactor comprising an inlet, an outlet, at least two blocks of electrodes each having at least one anode and at least one cathode, and means allowing the effluent to be treated to circulate between the electrodes in upward direction;
  b) upwardly running the effluent to be treated between the electrodes of a first block so as to subject the effluent to an electrical current thereby treating the effluent by electrocoagulation or electroflotation, thus producing a sludge containing at least one pollutant that is comprised in the effluent to be treated, and a first treated effluent; and
  c) upwardly running the treated effluent obtained in step (b) between the electrodes of a second block so as to subject the effluent to an electrical current thereby treating the effluent by electrocoagulation or electroflotation, thus producing a sludge containing at least one pollutant that is comprised in the effluent to be treated, and a second treated effluent, and in that during step (b) and/or (c), the sludge produced is separated from the treated effluent.

According to a third aspect, the invention concerns an apparatus for treating effluents comprising:

a reactor having an inlet for the effluent to be treated and an outlet for the treated effluent, and comprising at least one block of electrodes, the block having at least one anode and at least one cathode, the electrodes being disposed substantially parallel to one another and they are spaced so as to define therebetween a space permitting passage of the effluent to be treated, thus producing, when the effluent to be treated is subject to an electrical current, a sludge comprising at least one pollutant that is contained in the effluent to be treated and a treated effluent, the reactor also comprising means allowing the effluent to circulate between the electrodes in upward direction; and means allowing to separate the sludge produced, from the treated effluent.

It was discovered that by using the processes and apparatuses mentioned above, it was possible to decontaminate an effluent by obtaining a satisfactory abatement rate of various contaminants.

The expression "circulate between the electrodes in upward direction" as used by the Applicant means that the effluent circulates between the electrodes, from bottom to top between the latter.

The sludge that is produced in the processes of the invention may be sucked in through a suction means in order to separate it from the treated effluent. The suction means may be a suction device or a pump. Alternately, the sludge produced may be separated from the effluent by action of a conveyor comprising a moving conveyor belt, to which the sludge adheres, to be conveyed and separated from the treated effluent. The conveyor belt may be a filtering membrane. The effluent to be treated may be allowed to run many times between the electrodes of one or more blocks.

In a non limiting manner, the processes of the invention may produce an abatement rate of at least 85% of the suspended matter that is present in the effluent to be treated. The processes of the invention may also produce an abatement rate of at least 85%, preferably at least 95% and still more preferably at least 98%, of the turbidity of the effluent to be treated. The processes of the invention may also produce an abatement rate of at least 85%, preferably at least 95% and still more preferably at least 98%, of the orthophosphates that are present in the effluent to be treated. The processes of the invention can also produce an abatement rate of at least 85% and preferably at least 95%, of phosphorus that is present in the effluent to be treated. The processes of the invention may also produce an abatement rate of at least 85% and preferably at least 95% of the total Kjeldahl nitrogen that is present in the effluent to be treated. The processes of the invention may also produce an abatement rate of at least 75% and preferably at least 90%, of the Five-day biochemical oxygen demand, of the effluent to be treated.

In the apparatus of the invention, the reactor preferably comprises a means allowing the effluent to flow in a manner to limit turbulence. This means may be at least one baffle consisting of at least two walls or a network of baffles consisting of a plurality of walls. The reactor may be connected, preferably by means of a duct, to a feeding tank adapted to contain an effluent to be treated. The reactor may comprise a feeding compartment connected to the feeding tank, preferably by means of a duct. The effluent to be treated that is present in the feeding tank may be sent to the reactor, preferably to the feeding compartment, through a means allowing sending the effluent from the feeding tank to the reactor, preferably by means of a pump. Alternately, the effluent may be sent from the feeding tank to the reactor by gravity.

In the processes and the apparatus of the invention, the effluent preferably circulates between the electrodes in a manner to minimize turbulence, thus promoting flotation of the produced sludge. The fact of obtaining such a flotation where the contaminant particles are substantially all grouped at the surface of the treated effluent, makes it possible to largely facilitate the step of separating the sludge and the treated effluent. Thus, it is possible to separate the formed sludge from the treated effluent by a simple suction means or a simple filtering means without having to rely on flocculants, additional sedimentation chambers or any other complex mechanical means of liquid/solid separation. In a non limiting manner, the average flow of the effluent in the reactor may be lower than 8 liters per minutes for a volume of about 7000 to about 11500 $cm^3$ and preferably about 8500 to about 10500 $cm^3$, representing the total volume of the spaces between the electrodes (preferably between 18 and 26 electrodes) of a block (having the shape of a rectangular shaped and preferably a substantially cubic shaped prism). Preferably, the flow is about 0.5 to 5 liters per minute and more preferably from 1 to 3 liters per minutes. In the light of these non limiting examples, the man of the art will understood that it is possible to minimize turbulence of the effluent by using other values for the effluent flow and other values for the total surface of the electrodes. The man of the art will also understand that a minimization of the turbulence of the effluent will promote flotation of the sludge. The electrodes are preferably flat electrodes. The electrodes are preferably immersed in the effluent so as to permit a better flotation of the sludge. The electrodes may be full, in the form a grid or in the form of a comb. The electrodes of the blocks are preferably connected to a generator of direct, alternating or pulsed current. Preferably, all the electrical connections are individually made for each electrode.

In the process of the invention, one or more electrode block(s) may be used to provide an electrocoagulation or an electroflotation. When a block is used to treat the effluent by electrocoagulation, its electrodes preferably comprise aluminum, calcium or iron. Alternately, its electrodes may comprise at least one anode including a source of $Ca^{2+}$ ions. When a block is used to treat the effluent by electroflotation, its electrodes preferably comprise inert electrodes. The inert electrodes may be electrodes comprising platinum or electrodes comprising iridium coated titanium. It will appear obvious to the man of the art that other types of known inert electrodes may also be used.

In the process according to the second aspect of the invention, the effluent is preferably treated by electrocoagulation in step (b) and by electroflotation in step (c). The electrodes of the first block preferably comprise aluminum, calcium or iron. Alternately, the electrodes of the first block may comprise at least one anode including a source of $Ca^{2+}$ ions. The electrodes of the second block are preferably inert electrodes. The inert electrodes may be electrodes comprising platinum or electrodes comprising iridium coated titanium. Step (b) and/or (c) may be repeated many times.

In the apparatus of the invention, the electrodes may comprise aluminum, calcium or iron, or be inert electrodes. Alternately, the electrodes may comprise at least one anode including a source of $Ca^{2+}$ ions. One or more blocks of electrodes may be used to carry out an electrocoagulation or an electroflotation. When a block is used to treat the effluent by electrocoagulation, its electrodes preferably comprise aluminum, calcium or iron. When a block is used to treat the effluent by electroflotation, its electrodes are preferably inert electrodes.

The inert electrodes may be electrodes comprising platinum or electrodes comprising iridium coated titanium. Preferably, the reactor comprises two blocks, one having electrodes comprising aluminum, calcium or iron, and the other having inert electrodes. The inert electrodes may be electrodes comprising platinum or electrodes comprising iridium coated titanium. The block adapted to treat the effluent by electroflotation and having inert electrodes is preferably downstream of the block adapted to treat the effluent by electrocoagulation and having electrodes comprising aluminum, calcium or iron.

In the apparatus of the invention, the means allowing separation of the produced sludge from the treated effluent may be a sludge collector comprising:

- a recovery tank allowing to recover the sludge and having a framework provided with an upper orifice, a lower outlet to drain the sludge and an inlet provided with a first duct connected to the reactor, the inlet being disposed at a height between the upper orifice and the lower outlet; and
- a suction means connected by means of a second duct to the upper orifice of the recovery tank and allowing to send the sludge of the reactor to the recovery tank.

The sludge recovery tank preferably comprises one horizontal wall disposed at a predetermined level between the inlet and the lower outlet and defining an upper chamber and a lower chamber. The horizontal wall is perforated so as to allow the sludge that is recovered from the upper chamber to pass towards the lower chamber.

In the apparatus of the invention, the reactor may also comprise means for recycling the treated effluent that exits from the reactor outlet towards the feeding compartment for an additional treatment. The inlet of the reactor is preferably provided with a separation means that prevents coarse particles present in the effluent to enter the reactor. This separation means may be a grid comprising meshes having predetermined dimensions. The reactor may also comprise a means allowing forwarding of the effluent contained in the feeding tank to the reactor. This means may be a pump.

In the processes and the apparatus of the invention, when an anode comprising a source of $Ca^{2+}$ is used, the latter may be obtained or prepared from a mixture comprising the source of $Ca^{2+}$ ions, a support and water. The $Ca^{2+}$ ions may be present in the mixture in a proportion of about 2% to about 30% and preferably about 5% to about 20% by weight, with respect to the total weight of the mixture. The source of $Ca^{2+}$ ions preferably comprises calcium carbonate ($CaCO_3$), lime ($Ca(OH)_2$) or a mixture thereof. Preferably, the source of $Ca^{2+}$ is calcium carbonate. When the source of $Ca^{2+}$ is calcium carbonate, the latter may be present in the mixture in a proportion of about 10% to about 50% and preferably about 25% to about 40% by weight, with respect to the total weight of the mixture. The support may be present in the mixture in a proportion of about 40% to about 80% and preferably about 45% to about 65% by weight, with respect to the total weight of the mixture. The support may comprise as components, a silty clay, a ceramic or a cement, in association with a conductive material. This conductive material may advantageously be an industrial residue. The conductive material that is comprised in the support may be selected from the group consisting of graphite, coke, carbon fibers, and a mixture thereof. Graphite is preferred. Water may be present in the mixture in a proportion of about 2 to about 30% and preferably about 10% to about 20% by weight, with respect to the total weight of the mixture.

According to a first preferred embodiment of the apparatus of the invention, the reactor comprises a single block of electrodes. Preferably, the means allowing the effluent to circulate between the electrodes in an upward direction comprises a first substantially vertical wall disposed upstream of the block of electrodes, and defining a lower pathway adapted to receive the effluent to be treated. The reactor may also comprise a feeding compartment upstream of the first wall. This feeding compartment is used to collect the effluent to be treated that originates from the feeding tank. Preferably, the reactor also comprises a means allowing the effluent to flow in a manner to minimize turbulence. The means allowing the effluent to flow in a manner to minimize turbulence may allow the effluent to be treated that originates from the feeding tank to flow in a manner to minimize turbulence before reaching the first wall, and may comprise a second substantially vertical wall disposed between the inlet of the reactor and the first wall. The second wall defines an upper pathway adapted to receive the effluent to be treated. The second substantially vertical wall preferably allows a control of the level of effluent in the reactor.

The reactor may also comprise a compartment for holding the treated effluent, disposed downstream of the block of electrodes. The means allowing the effluent to flow in a manner to minimize turbulence may also comprise a third substantially vertical wall disposed between the block of electrodes and the holding compartment and defining a lower pathway adapted to receive the treated effluent. This third wall makes it possible for the treated effluent that originates from the block of electrodes to flow so as to minimize turbulence before entering the holding compartment.

The means allowing the effluent to flow so as to minimize turbulence may also comprise a fourth substantially vertical wall disposed upstream of the third wall. The third and fourth walls define therebetween another space making it possible for the effluent to flow so as to minimize turbulence. The fourth wall defines an upper pathway disposed at a predetermined height so as to prevent the sludge from penetrating into the other space.

Preferably, the block of electrodes is raised with respect to the bottom of the reactor so as to define an additional space that communicates with the space provided between the electrodes, which allows the effluent to be treated to circulate under the electrodes. The block of electrodes is preferably mounted on a support that removably rests at the bottom of the reactor and allows the effluent to be treated to pass through the additional space. Alternately, the support may be fixed, removably or not, on at least one of the walls of the reactor to allow the effluent to be treated to pass through the additional space.

According to a second preferred embodiment of the apparatus of the invention, the reactor may comprise a single block of electrodes and preferably comprises a means allowing the effluent to flow in a manner to minimize turbulence. The block of electrodes may be raised with respect to the bottom of the reactor so as to define an additional space that is in communication with the space between the electrodes and allowing the effluent to be treated to circulate below the electrodes. The means allowing the effluent to circulate between the electrodes in an upward direction may comprise a duct that connects the inlet of the reactor with the additional space. Preferably, the means allowing the effluent to flow so as to minimize turbulence comprises a transition tank disposed downstream of the block of electrodes, and communicating with the latter, the transition tank makes it possible to collect the effluent that has been treated with the block of electrodes. Preferably, the block of electrodes is mounted on a support that removable rests on the bottom of the reactor and allows the effluent to be treated to pass through the additional space. Alternately, the support may be fixed, removably or not, to at least one of the walls of the reactor and permits the effluent to be treated to pass through the additional space. Preferably, the reactor additionally comprises a feeding compartment upstream of the block of electrodes.

According to a third preferred embodiment of the apparatus of the invention, the reactor may comprise a first block of electrodes and a second block of electrodes, the latter being disposed downstream of the first block of electrodes. The means allowing the effluent to circulate in upward direction between the electrodes may comprise a first substantially vertical wall disposed upstream of the first block of electrodes and defining a lower pathway adapted to receive the effluent to be treated. The reactor may also comprise a feeding compartment upstream of the first wall. This feeding compartment is used to collect the effluent to be treated coming from the feeding tank. Preferably, the reactor also comprises a means making it possible for the effluent to flow so as to minimize turbulence. The means making it possible for the effluent to flow so as to minimize turbulence may allow the effluent to be treated coming from the feeding tank to flow so as to minimize turbulence before reaching the first wall, and may comprise a second substantially vertical wall disposed between the inlet of the reactor and the first wall. The second wall defines an upper pathway adapted to receive the effluent to be treated.

The second substantially vertical wall preferably permits to control the level of the effluent in the reactor. The reactor may also comprise a holding compartment for the treated effluent that is disposed downstream of the second block of electrodes. The means allowing the effluent to flow so as to minimize turbulence preferably comprises a third substantially vertical wall disposed between the second block of electrodes and the holding compartment and defining a lower pathway adapted to receive the treated effluent. The third wall allows the treated effluent that originates from the second block of electrodes to flow so as to minimize turbulence before entering the holding compartment.

The means allowing the effluent to flow so as to minimize turbulence may also comprise a fourth substantially vertical wall disposed upstream of the third wall. The third and fourth walls define therebetween another space allowing the effluent to flow so as to minimize turbulence. The fourth wall defines an upper pathway disposed at a predetermined height so as to prevent the sludge from penetrating into the other space. Preferably, the blocks of electrodes are separated by a means allowing the effluent to circulate from bottom to top between the electrodes of the second block. The means separating the blocks of electrodes and allowing the effluent to circulate from bottom to top between the electrodes of the second block may also comprise a fifth substantially vertical wall defining a lower pathway adapted to receive the treated effluent that originates from the first block of electrodes. Moreover, this means may comprise a sixth wall disposed upstream of the fifth wall. The fifth and sixth walls define therebetween an additional space allowing the effluent to flow so as to minimize turbulence. The sixth wall defines an upper pathway disposed at a predetermined height so as to prevent the sludge from penetrating into the additional space.

The blocks of electrodes are preferably raised with respect to the bottom of the reactor so that the blocks of electrodes each define an additional space that is in communication with the space between their electrodes and allow the effluent to be treated to circulate under the electrodes. Each of the blocks of electrodes may be mounted on a support that removably rests on the bottom of the reactor and allows the effluent to be treated to run through the additional space. Alternately, the support may be fixed, removably or not, to at least one of the walls of the reactor, and allows the effluent to be treated to run through the additional space.

In the apparatuses according to the first and third embodiments of the invention, the electrodes are preferably disposed according to a plane and the global displacement of the effluent in the reactor from the inlet to the outlet is carried out perpendicularly to that plane. The reactor may also comprise another wall disposed downstream of the third wall, the other wall defining an upper pathway and allowing control of the level of the effluent in the reactor.

According to a fourth preferred embodiment of the apparatus of the invention, the reactor may comprise a first block of electrodes and a second block of electrodes, the latter being disposed downstream of the first block of electrodes. Preferably, the reactor comprises a means allowing the effluent to flow so as to minimize turbulence. The block of electrodes is preferably raised with respect to the bottom of the reactor so as to define an additional space between each of the blocks and the bottom. The additional space is in communication with the space between the electrodes and allows the effluent to be treated to circulate under the electrodes. The means allowing the effluent to circulate in upward direction between the electrodes may comprise a duct connecting the inlet of the reactor with the additional space of the first block of electrodes. Each block of electrodes is preferably mounted on a support that removably rests on the bottom of the reactor and allows the effluent to be treated to pass through the additional space. Alternately, the support may be fixed, removably or not, to at least one of the walls of the reactor and allows the effluent to be treated to pass through the additional space.

In the apparatus according to the fourth preferred embodiment of the invention, the means allowing the effluent to flow so as to minimize turbulence may comprise a first transition tank disposed downstream of the first block of electrodes, and in communication with the latter. The first transition tank makes it possible to collect the effluent that has been treated with the first block of electrodes. Moreover, this means may also comprise a second transition tank disposed downstream of the second block of electrodes, and in communication with the latter. The second transition tank makes it possible to collect the effluent that has been treated with the second block of electrodes.

The means enabling to separate the sludge produced from the treated effluent may also comprise a conveyor having one part disposed in the transition tank. The conveyor comprises a movable belt to which the sludge adheres in order to be transported and separated from the treated effluent. The means allowing separation of the sludge produced from the treated effluent may also comprise a conveyor having a part disposed in the second transition tank. The conveyor comprises a movable belt to which the sludge adheres in order to be transported and separated from the treated effluent. The belt may be a filtering membrane.

In the apparatus according to the fourth preferred embodiment of the invention, the conveyor is preferably in communication with a sludge collector comprising:
  a recovery tank allowing to recover the sludge and having a framework provided with an inlet and an outlet to drain the sludge; and
  a suction means connected by means of a duct to the recovery tank allowing to forward the sludge from the inlet up to the inside of the framework and to clean said belt.

The conveyor of the first or second block of electrodes is preferably provided with a filter. This filter allows filtering of the effluent that comes from the first or second block of electrodes before it penetrates into the corresponding transition tank. The means allowing the effluent to upwardly circulate between the electrodes may comprise a duct connecting the first transition tank with the additional space of the second block of electrodes. This duct may also comprise a bypass adapted to forward the treated effluent originating from the first transition tank up to the space below the electrodes of the first block for an additional treatment. The reactor may also comprise a tank adapted to receive the treated effluent, the tank being in communication on the one hand with the second transition tank by means of a duct and on the other hand with the outlet for the treated effluent.

In the apparatus of the invention, the duct valves, the current generator as well as the pump may all be connected to a control system. This system may make it possible to automatically control the inlet flow of the effluent to be treated and the outlet flow of the effluent that is treated in the apparatus, as well as the current that is applied to the electrodes. The apparatus may be raised above the ground and disposed on a support where the ducts of the various tanks are connected. The electrodes may be 15 to 100 cm high, preferably between 20 and 50 cm. The electrodes may be 15 to 100 cm wide, preferably between 20 and 50 cm. The electrodes may be 1.5 to 8 mm thick, preferably between 1.6 and 5 mm. A block of electrodes preferably comprises between 14 and 30 and more preferably between 18 and 26 electrodes. The space between two adjacent electrodes in the block may be from 0.5 to 1.5 cm and preferably it is between 0.7 and 1.1 cm.

In the apparatus of the invention, the reactor may comprise a means enabling to reverse the polarity of the electrodes and/or a means making it possible to self clean the electrodes. The means making it possible to self clean the electrode may consist of a device that produces vibrations and preferably ultrasonic waves. The feeding tank may also be provided with a chimney allowing evacuation of the gases produced in the reactor. The reactor preferably comprises a device allowing recovery of the gases produced. The support of the electrodes may consist of a non-conductive material, such as a non-conductive polymer. The framework of the apparatus may also consist of the same material as the supports. By way of example of non-conductive polymer, polymethylmethacrylate may be mentioned. The reactor may comprise a means enabling to carry out a quality control of the treated effluent. The means to carry out quality control of the treated effluent may comprise an infrared reader.

The apparatus and the processes of the invention therefore allow an efficient treatment of the effluents of various compositions and that can contain a wide range of contaminants. The apparatus and the processes of the invention are therefore useful for purposes of environment protection or to allow a user to comply with the norms of the environment.

When treating effluents, the electrolysis reactions with electrodes make it possible to produce oxygen and hydrogen micro-bubbles. These micro-bubbles, which are finely divided, in their ascending movement, will carry the flocculates thus formed.

Dissolution of the metallic ions of the anode causes a considerable increase of the roughness of the anodes. For this reason, electrocoagulation cannot produce tiny and uniform bubbles. The dimensions of the bubbles produced by electrocoagulation are in general larger than 100 µm. Moreover, the roughness of the surface of the anode causes an increase of the adhesive force of the bubbles which decreases the effectiveness of the treatment. It is generally estimated that the smaller the bubbles, the higher the efficiency of the separation process.

When the treatment of an effluent is carried out with inert electrodes, the process is called electroflotation. The interest of electroflotation resides more so in removing the particles that have been aggregated but have not been separated during the process of electrocoagulation.

During an electroflotation, the inert electrodes in use are smooth, and they reduce and make the size of the microbubbles uniform, thus minimizing the effects of their adhesiveness. The small size bubbles allow for a better flotation of the particles in suspension in the effluent. Moreover, these electrodes are not soluble and are not degraded with use. They have therefore a life span that is longer than the soluble electrodes and therefore require less maintenance. On the other hand, the absence of metallic cations, which are required for neutralizing the electrical charges of the pollutants, reduces the pollution control effectiveness of these effluents. It may therefore be very advantageous to combine electrocoagulation and electroflotation when treating an effluent.

BRIEF DESCRIPTION OF THE FIGURES

Other characteristics and advantages of the invention will appear more clearly upon reading the description which follows of a preferred embodiment of the invention as illustrated by way of example in the annexed drawings, in which.

DETAILED DESCRIPTION OF THE INVENTION

Figure 1:
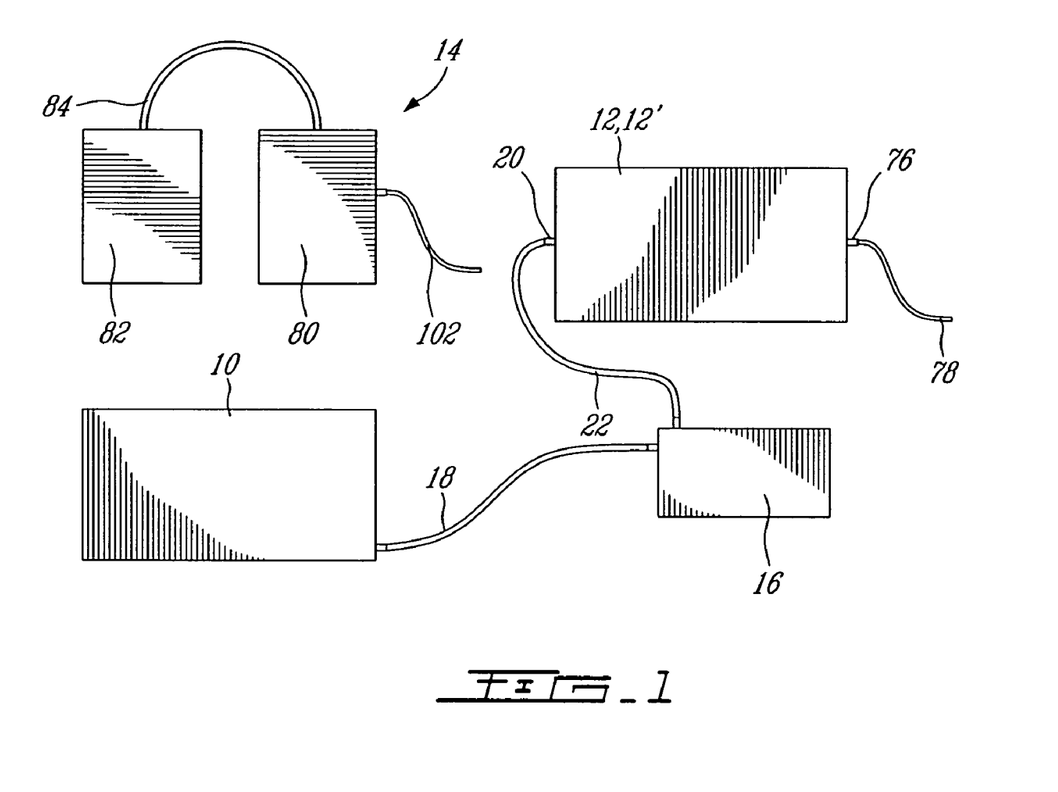
FIG. 1 is a schematic representation of an apparatus for the treatment of effluents, according to a preferred embodiment of the invention.

FIG. 1 is a schematic representation of an apparatus for the treatment of effluents comprising a feeding tank 10 adapted to receive the effluent to be treated, a reactor 12 or 12' used for treating the effluent and a sludge collector 14 to recover the sludge produced when treating the effluent. The feeding tank 10 is connected to a pump 16 via a duct 18. Pump 16 is connected to inlet 20 of reactor 12 or 12' by means of a duct 22.

Figure 2:
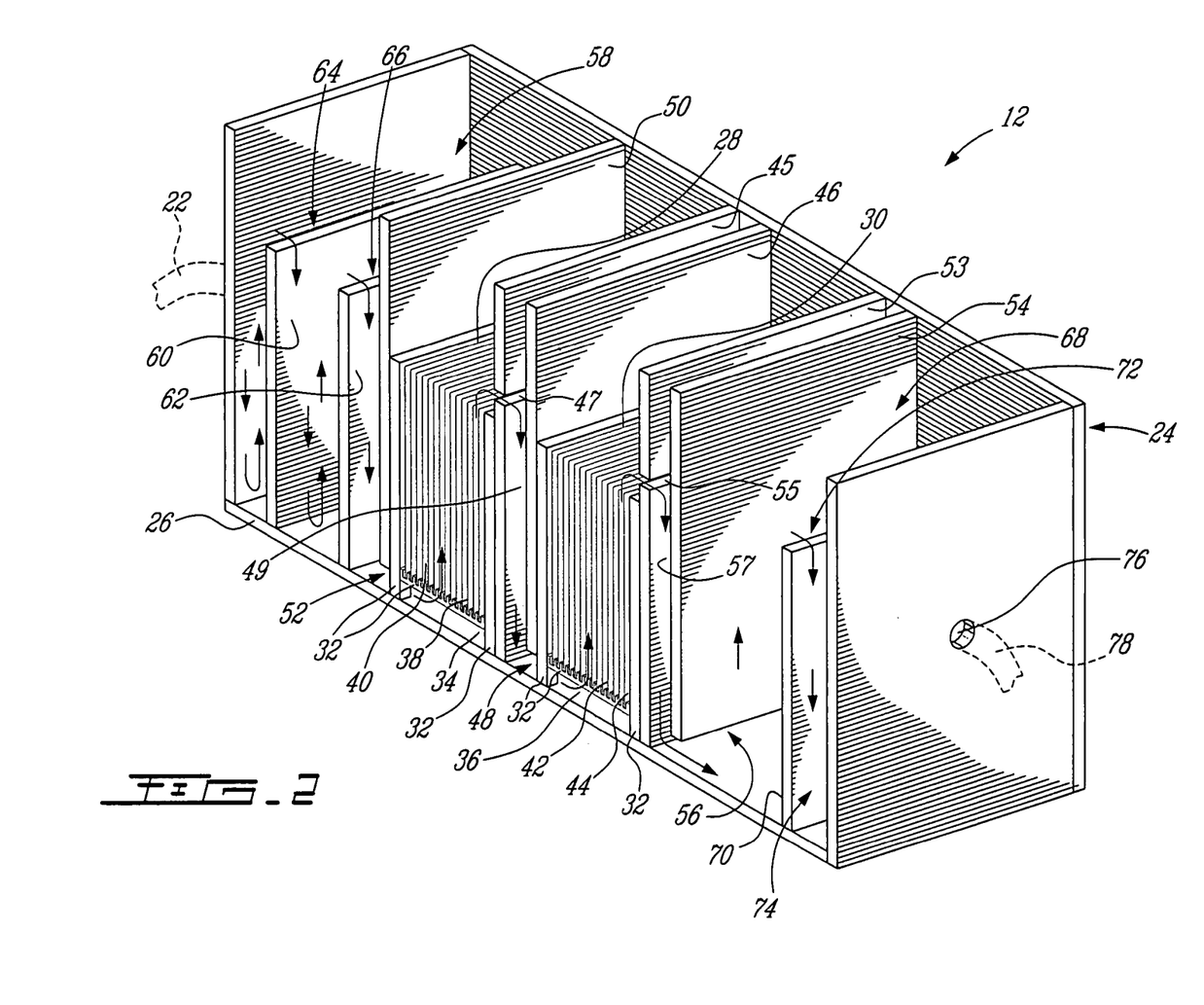
FIG. 2 is a perspective view of the reactor used in the apparatus illustrated in FIG. 1, in which the cover and a vertical lateral wall have been removed for purposes of illustration.

As illustrated in FIG. 2, reactor 12 comprises a framework 24, a bottom 26, a removable cover (not illustrated) and two blocks of electrodes 28 and 30, disposed inside framework 24. Each of these blocks of electrodes is mounted on a support 32. Supports 32 respectively define under blocks 28 and 30, spaces 34 and 36 allowing passage of the effluent to be treated. The block of electrodes 28 comprises electrodes 38 disposed in parallel fashion and the electrodes 38 are spaced so as to define therebetween spaces 40 that provide for the passage of the effluent. In an analogue fashion, block 30 comprises electrodes 42 disposed in parallel fashion and the electrodes 42 are spaced so as to define therebetween spaces 44 which provides for the passage of the effluent. The blocks of electrodes 28 and 30 may include or not the same number of electrodes and electrodes 38 and 42 may consist of the same material or not. The nature of the material(s) constituting electrodes 38 and 42 may vary depending on the composition of the effluent to be treated and on the contaminants that it contains. The block of electrodes 28 and 30 are separated by two walls 45 and 46 respectively having an upper pathway 47 and a lower pathway 48 and defining therebetween a space 49 allowing the effluent to flow so as to minimize turbulence. Upper pathway 47 is disposed at such a height that it prevents the sludge to penetrate into space 49. A wall 50 is disposed upstream of the block of electrodes 28, wall 50 defining a lower pathway adapted to receive the effluent to be treated. A wall 53 defining an upper pathway 55 is disposed downstream of the block of electrodes 30 and a wall 54 defining a lower pathway is disposed downstream of wall 53. Walls 53 and 54 define therebetween a space 57 allowing the effluent to flow so as to minimize turbulence before penetrating into a holding compartment 68 disposed downstream of wall 54 and adapted to receive the treated effluent.

Reactor 12 also comprises a feeding compartment 58 disposed upstream of wall 50. Compartment 58 is provided with walls 60 and 62 respectively defining upper pathways 64 and 66 which allow the effluent to circulate so as to minimize turbulence. On the other hand, holding compartment 68 comprises a wall 70 defining an upper pathway 72 and a sub-compartment 74 that is used to collect the effluent intended to be evacuated from reactor 12 through an outlet 76 and by means of a duct 78.

Figure 3:
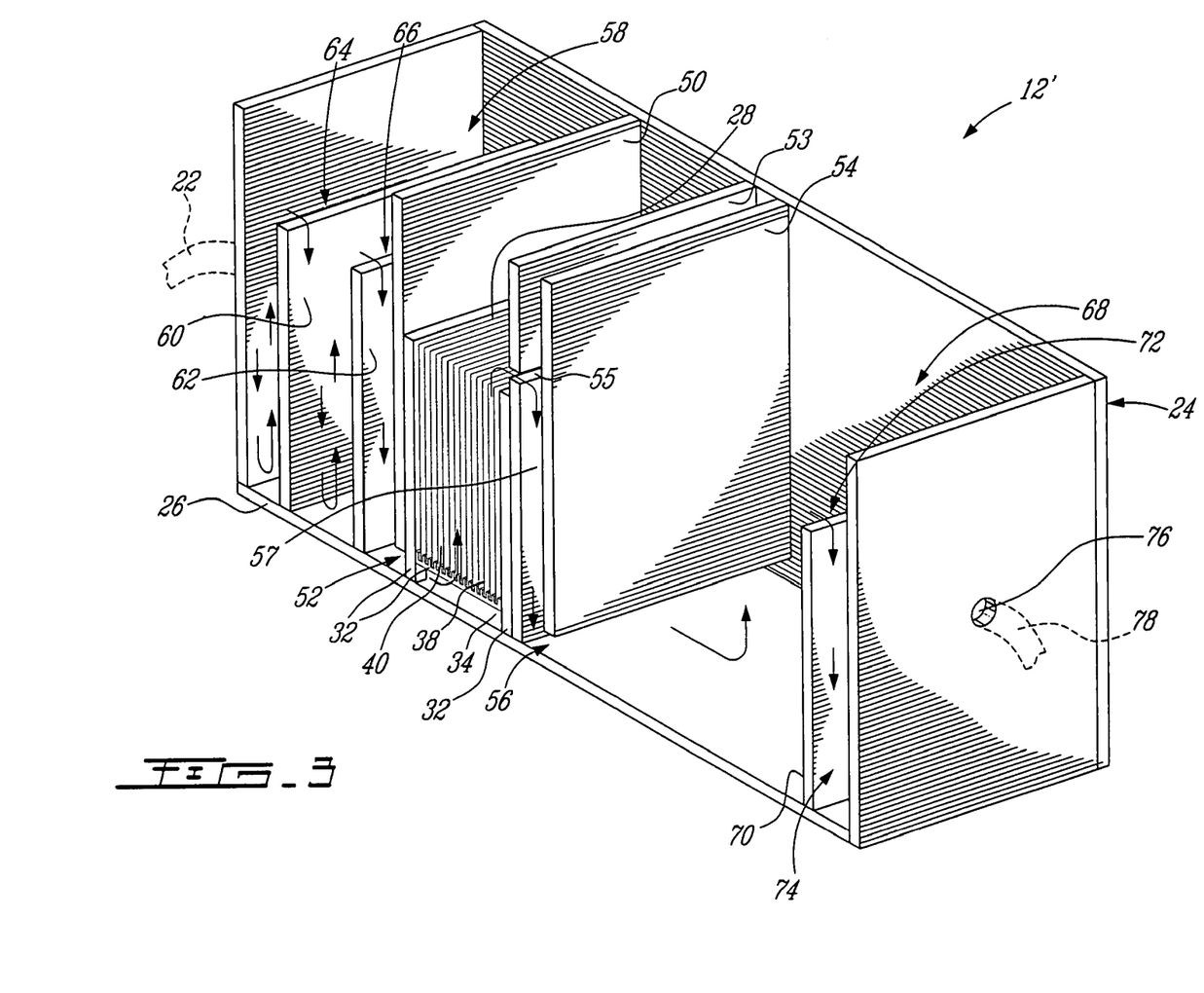
FIG. 3 is a perspective view of a variant of the reactor used in the apparatus illustrated in FIG. 1, in which the cover and a vertical lateral wall have been removed for purposes of illustration.

As illustrated in FIG. 3, reactor 12' comprises a framework 24, a bottom 26, a removable cover (not illustrated) and a block of electrodes 28 disposed inside framework 24. The block of electrodes 28 is mounted on a support 32. Support 32 defines under the block of electrodes 28 a space 34 allowing passage of the effluent to be treated. The block of electrodes 28 comprises electrodes 38 disposed in parallel fashion and the electrodes are spaced in order to define therebetween spaces 40 allowing passage of the effluent. The nature of the material(s) constituting the electrodes may vary depending on the composition of the effluent to be treated and on the contaminants that are present in the latter. A wall 50 is disposed upstream of the block of electrodes 28, wall 50 defining a lower pathway 52 adapted to receive the effluent to be treated. A wall 53 defining an upper passage 55 is disposed downstream of the block of electrodes 28 and a wall 54 that defines a lower passage 56 is disposed downstream of wall 53. Walls 53 and 54 define therebetween a space 57 allowing the effluent to flow so as to minimize turbulence before penetrating into a holding compartment 68 disposed downstream of wall 54 and adapted to receive the treated effluent.

Reactor 12' also comprises a feeding compartment 58 disposed upstream of wall 50. Compartment 58 is provided with walls 60 and 62 respectively defining upper pathways 64 and 66 that make it possible for the effluent to flow so as to minimize turbulence. On the other hand, holding compartment 68 comprises a wall 70 defining an upper passage 72 and a sub-compartment 74 that are used to collect the effluent intended to be evacuated from reactor 12' through an outlet 76 and by means of a duct 78.

Figure 4:
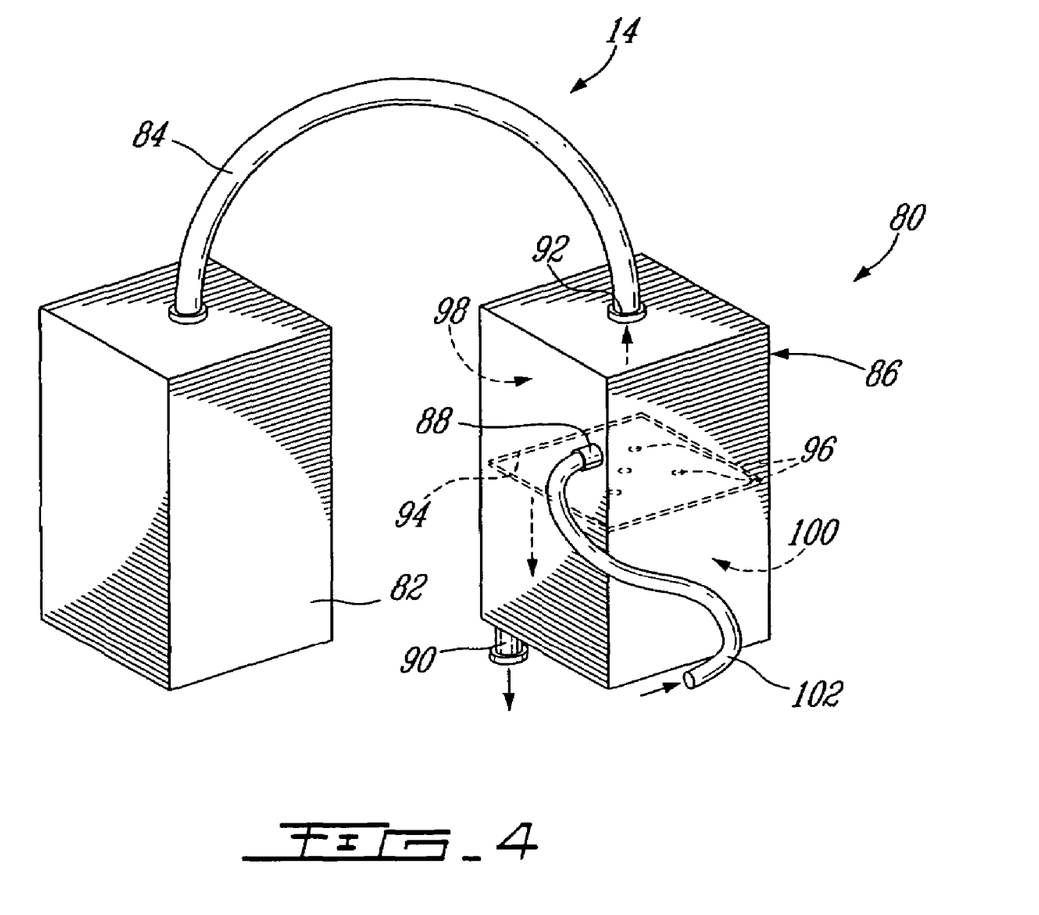
FIG. 4 is a perspective view of the sludge collector used in the apparatus illustrated in FIG. 1.

As illustrated in FIG. 4, sludge collector 14 comprises a recovery tank 80 connected to a suction device 82 via a duct 84. Tank 80 comprises a framework 86 provided with an inlet 88, a lower outlet 90 and an upper orifice 92 connected to duct 84. A wall 94 provided with perforations 96 is disposed inside framework 86. Wall 94 defines an upper chamber 98 and a lower chamber 100. Inlet 88 is connected to a duct 102 by means of which the sludge that is produced is sucked in. The perforations 96 of wall 94 allow the sludge to pass from upper chamber 98 to lower chamber 100.

When the apparatus of FIG. 1 is provided with reactor 12, the effluent to be treated is homogenized in tank 10 with a homogenization means (not illustrated), and it is then, by means of pump 16, sent in ducts 18 and 22 before reaching inlet 20 of reactor 12. The effluent to be treated then ends up in compartment 58 of reactor 12 where it flows along walls 60 and 62 so as to minimize turbulence, and then through upper pathways 64 and 66. Then, the effluent flows between walls 50 and 62, so as to minimize turbulence, before passing through lower pathway 52 and circulating in space 34 under the block of electrodes 28 that rests on support 32. The effluent then climbs between electrodes 38, in spaces 40, in order to be treated and a sludge is thus produced. The electrodes are immersed in the effluent so as to allow for a better flotation of the sludge. The effluent flows in spaces 40 so as to minimize turbulence and to promote flotation of the sludge. Micro-bubbles of oxygen and hydrogen are then formed during the electrolysis of the effluent and they upwardly carry with them the pollutant particles contained in the effluent, thus forming a sludge. The sludge thus produced has a low density and is in the form of a foam by reason of the micro-bubbles mentioned above. Low density additionally allows the sludge to float at the surface of the effluent. The effluent thus treated for a first time, passes through pathway 47 in order to reach space 49 defined between walls 45 and 46 where it flows so as to minimize turbulence before passing through lower pathway 48. Then, the effluent circulates in space 36 under the block of electrodes 30 that rests on the other support 32. The effluent then rises between electrodes 42, in spaces 44, in order to be treated for a second time and another sludge is thus produced. The treated effluent then flows in spaces 44 so as to minimize turbulence and promotes flotation of the sludge. Following this second treatment, the treated effluent passes through pathway 55 in order to reach space 57 defined between walls 53 and 54 where it flows so as to minimize turbulence before passing through lower pathway 56 and reaching holding compartment 68.

The treated effluent then follows wall 70 before passing through upper pathway 72 and reaching sub-compartment 74. Finally, the treated effluent is evacuated from reactor 12 through outlet 76 and then duct 78. In reactor 12, walls 45, 46, 50, 53, 54, 60, 62 and 70 therefore constitute a network of baffles that permits to minimize turbulence of the effluent. In a similar manner, in reactor 12' walls 50, 53, 54, 60, 62 and 70 therefor constitute a network of baffles.

When the apparatus of FIG. 1 is provided with reactor 12', the effluent circulates in reactor 12', in a manner that is similar to that previously mentioned for reactor 12.

The sludge produced above the blocks of electrodes 28 and 30 of reactor 12, or that produced above the block of electrodes 28 of reactor 12', is recovered with sludge collector 14 illustrated in FIG. 4. The sludge is sucked in through duct 102 and then penetrates into upper chamber 98 of tank 80 via inlet 88. This suction is produced by suction device 82 that is connected to tank 80 by means of duct 84. Then, the sludge passes through perforations 96 of wall 94 in order to reach lower chamber 100 where it is finally evacuated via lower outlet 90. The sludge that was in the form of foam eventually looses its air bubbles as well as water and tends to become dense.

Figure 5:
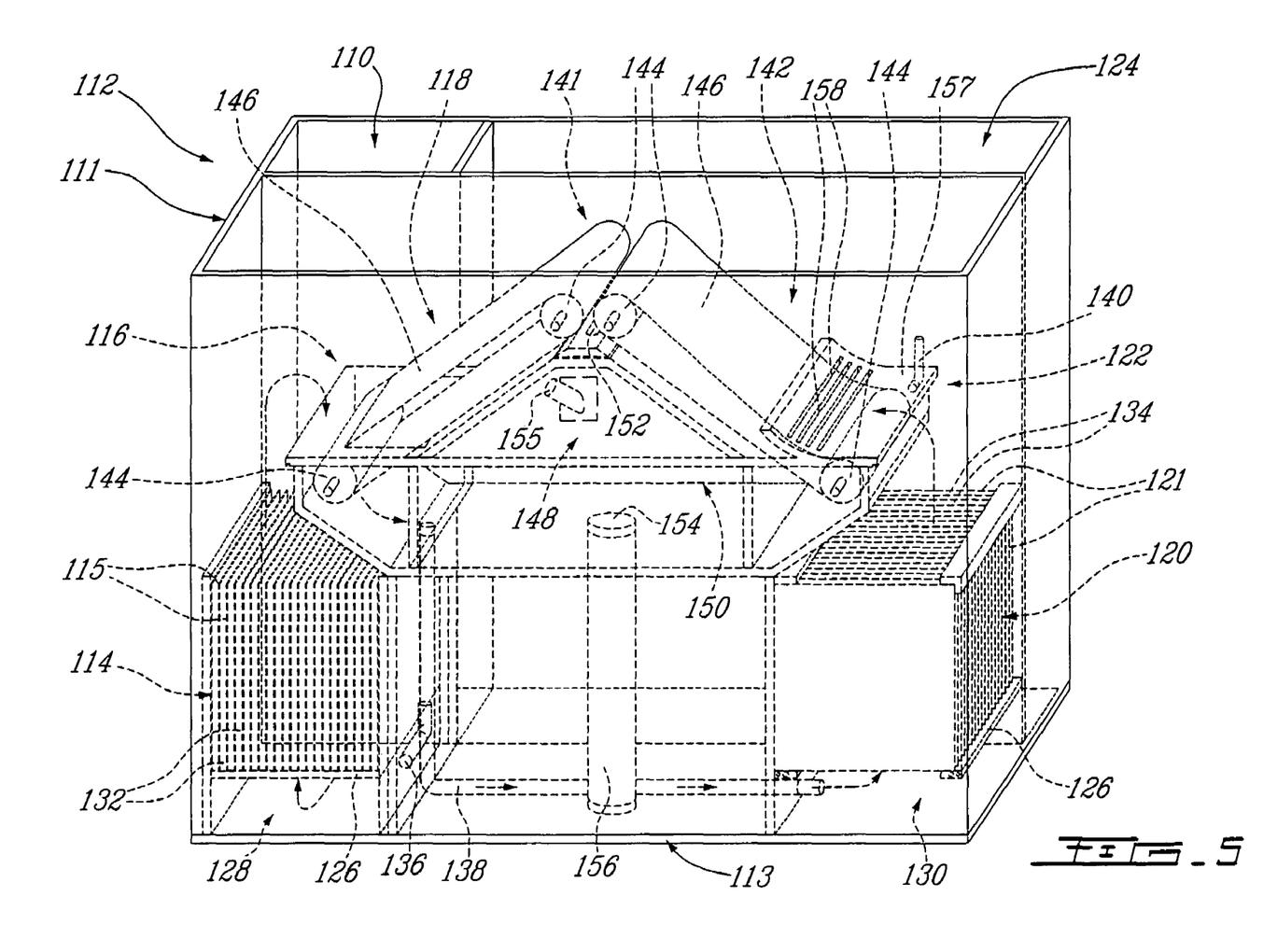
FIG. 5 is a perspective view of a reactor for the treatment of effluents, according to another preferred embodiment of the invention.

FIG. 5 is a schematic representation of an apparatus for the treatment of effluents including a reactor 112 comprising a framework 111, a bottom 113, a feeding compartment 110 adapted to receive the effluent to be treated, a first block of electrodes 114, a first transition tank 116, a sludge separator 118, a second block of electrodes 120, a second transition tank 122, and a tank adapted to receive the treated effluent 124. Each of these blocks of electrodes is mounted on a support 126 that is fixed to the walls of the framework 111. Supports 126 respectively define under blocks 114 and 120, spaces 128 and 130 allowing for the passage of the effluent to be treated. The block of electrodes 114 comprises electrodes 115 disposed in parallel fashion and the electrodes 115 are spaced so as to define therebetween spaces 132 allowing for the passage of the effluent. In a similar manner, block 120 comprises electrodes 121 disposed in parallel fashion and the electrodes 121 are spaced so as to define therebetween spaces 134 allowing for the passage of the effluent. The blocks of electrodes 114 and 120 may include or not the same number of electrodes and the electrodes 115 and 121 may consist of the same material or not. The nature of the material(s) that constitute(s) the electrodes 115 and 121 may vary depending on the composition of the effluent to be treated and the contaminants that are present in the latter.

Feeding compartment 110 and reactor 112 are connected together by means of a duct 136 in which one end is located below block 114, in space 128, in order to allow the effluent to circulate from the bottom to the top of electrodes 115. The transition tank 116 is connected to space 130 by means of a duct 138. Transition tank 122 is connected to the tank of treated effluent 124 by means of a duct 140. The sludge separator 118 comprises conveyors 141 and 142 each including rollers 144 and a belt 146, and a sludge collector 148 comprising a recovery tank 150 adapted to receive the sludge, an inlet 152 and an outlet 154. Conveyors 141 and 142 are driven by a motor (not illustrated). The motor drives the upper rollers by friction. Collector 148 also comprises an outlet 155 that is connected to a suction means i.e. a pump or a suction device (not illustrated) and that permits to suck sludge at inlet 152. Outlet 154 is connected to a duct 156 through which the sludge is evacuated. Conveyor 142 is provided with a filter 157 comprising grooves 158. In reactor 112, the arrangement of block 114 with respect to tank 116, the arrangement of the latter with respect to block 120, and the arrangement of the latter with respect to tank 122 constitute a network of baffles in which the effluent circulates in a manner to minimize turbulence.

The effluent to be treated is therefore first introduced in feeding compartment 110 and is then sent through duct 136 as far as space 128 under the block of electrodes 114. Then, the effluent rises in spaces 132 between electrodes 115 where it is treated with an electrical current. The electrodes are immersed in the effluent so as to allow for a better flotation of the sludge. The effluent circulates between the electrodes so as to minimize turbulence and to help flotation of the sludge. Micro-bubbles of oxygen and hydrogen are then formed during electrolysis of the effluent and they bring with them, in the upward direction, the particles of pollutants that are present in the effluent, thus forming a sludge. The sludge thus produced has a low density and is found in the form of foam by reason of the micro-bubbles mentioned above. This low density also allows the sludge to float at the surface of the effluent. Both the effluent and sludge, after having reached block 114, are thereafter sent to the inlet of transition tank 116 where they will be separated from one another. The effluent passes through belt 146 of conveyor 141 to enter tank 116 while the sludge adheres to belt 146 of conveyor 141 and is thereafter sent towards inlet 152 where it is sucked in as far as recovery tank 150. Then, the sludge is evacuated through duct 156. A wall to be used as scraper (not illustrated) may be placed adjacent inlet 152 to loosen sludge from the belt and thus causing the sludge to more easily fall into inlet 152. The density of the sludge increases when it is sent by the conveyor and when it is introduced into tank 150. In fact, the sludge that was in the form of foam looses its air bubbles as well as water and has a tendency to become dense.

Following this, after the effluent has been substantially separated from the sludge by means of the belt, it leaves tank 116 by flowing in duct 138 before reaching space 130 under the block of electrodes 120 to be treated anew. As when it passes through the electrodes of block 114, the effluent rises in spaces 134 between the electrodes 121 of block 120 where it is treated with an electrical current. A sludge in the form of a foam is then produced similarly as when it is treated with block 114, and the effluent and the sludge are thereafter sent towards the inlet of transition tank 122 where they will be separated from one another by means of belt 146 of conveyor 142 as previously described for conveyor 141. Filter 157 prevents some pollutant particles to contaminate the treated effluent that is collected in tank 122. Then, the treated effluent leaves tank 122 to reach tank 124 through duct 140. This duct is adjustable and may be rotated so as to control the flow of effluent that exits from tank 144.

The apparatus of FIG. 5 may comprise a feeding tank connected to the feeding compartment by means of a duct. The effluent that is present in the feeding tank may be conveyed to the feeding compartment by means of a pump provided with a filter. The wall between the feeding compartment and the reactor may also comprise at least another inlet that is located above duct 136. This inlet consists of an orifice in this wall and the effluent that is present in compartment 110 flows along a duct before reaching space 128. The wall may also be provided with other similar inlets depending on the desired inlet flow into the reactor. The duct connecting the feeding tank and the feeding compartment as well as ducts 136, 138, and 140 may be provided with valves or a means allowing control of the flow of effluent in the apparatus. Tanks 110, 116, 122, 124 as well as the walls located under spaces 128 and 130 may also comprise outlets connected to ducts and allowing draining of the tanks. These ducts are preferably provided with valves. Similarly, in FIGS. 2 and 3, ducts 22 and 78 may be provided with valves or a means allowing control of the flow of effluent in these apparatuses. Compartment 58 and tank 68 may also comprise outlets connected to ducts and allowing drainage of the tanks. These ducts are preferably provided with valves.

In the apparatus according to FIG. 5, tank 122 may also comprise a bypass device making it possible, in some cases, to direct the treated effluent as far as space 128 under the electrodes of block 114, as far as space 130 under the electrodes of block 120 or in feeding compartment 110 for an additional treatment. This bypass device is a valve containing duct and the latter is opened if the means to control the quality of the effluent indicates that the treated effluent requires an additional treatment. Similarly, in the apparatuses of FIGS. 2 and 3, duct 78 may be provided with such a bypass device allowing a return of the effluent in compartment 58 for an additional treatment.

Before being directed into the feeding compartment, the effluent may be treated in order to adjust the pH and/or be homogenized. The pH may also be adjusted at the end of the treatment, and preferably in the tank of treated effluent, in order to comply with certain environmental norms. Readings may be made concerning the feeding tank and the tank of treated effluent, and the feeding compartment in order to determine the content of various pollutants and contaminants in the effluent to be treated and in the treated effluent.

EXAMPLES

Examples were carried out by using the apparatus as illustrated in FIG. 5. First, a wastewater from a plant for transforming meats was treated (Table 1) and as a second step, a dairy wastewater was treated (Table 2). During these treatments the two blocks of electrodes were each provided with 22 electrodes made of aluminum. The electrodes of the two blocks were identical. The electrodes were 22.5 cm by 24 cm and the space between the electrodes was 0.8 cm. The total volume of all the spaces (21 spaces) of a block was therefore 9072 cm$^3$. During these tests, the content of the various pollutants of the water to be treated and of the treated water was measured in order to determine the abatement rate obtained for each of these pollutants during the treatment. During the treatment of the wastewater from a plant for transforming meats (Table 1), 200 liters of water were treated at an average current of 78.4 A and an average tension of 4.6 V. The treatment lasted 106 minutes and the average flow rate was 1.9 liter per minute. During treatment of the wastewater from a dairy (Table 2) 240 liters of water were treated at an average current of 57.8 A and an average tension of 6.5 V. The treatment lasted 130 minutes and the average flow rate was 1.8 liter per minute. During the tests, the abatement rate was calculated in the following manner: [(initial concentration−final concentration)/initial concentration]×100.

TABLE 1

| Parameter | Units | Before treatment | After treatment | Abatement rate (%) |
|---|---|---|---|---|
| Conductivity | μS/cm | 4420 | 4290 | — |
| pH | — | 10.25 | 9.96 | — |
| True color | UCV | 313 | 68 | 78.27 |
| Turbidity | UTN | 240 | 37 | 84.58 |
| Total Kjeldahl Nitrogen | mg N/L | 110 | 48 | 56.36 |
| Orthophosphates | mg/P/L | 16 | 0.23 | 98.56 |
| Total phosphorus | mg P/L | 83 | 7 | 91.57 |
| Dissolved solids | mg/L | 2862 | 2286 | 20.12 |
| Soluble 5-day biochemical oxygen demand | mg/l | 1188 | 777 | 34.60 |
| 5-day biochemical oxygen demand | mg/L | 1374 | 1028 | 25.18 |
| Soluble chemical oxygen demand | mg/L | 2006 | 1094 | 45.46 |
| Chemical oxygen demand | mg/L | 2650 | 2160 | 18.49 |
| Total greases and oils | mg/L | 16.1 | 7.3 | 54.66 |

TABLE 2

| Parameter | Units | Before treatment | After treatment | Abatement rate (%) |
|---|---|---|---|---|
| Conductivity | μS/cm | 1641 | 1307 | — |
| pH | — | 7.36 | 9.72 | — |
| True color | UCV | 190 | <5 | 97.37 |
| Turbidity | UTN | 780 | 15.3 | 98.04 |
| Suspended matter | mg/L | 766 | 92 | 87.99 |
| Total Kjeldahl Nitrogen | mg N/L | 68 | 5.6 | 91.76 |
| Orthophosphates | Mg P/L | 98 | 0.46 | 99.53 |
| Total phosphorus | mg P/L | 98 | 1.2 | 98.77 |
| Dissolved solids | mg/L | 1388 | 1120 | 19.31 |
| Soluble 5-day biochemical oxygen demand | mg/l | 542 | 264 | 51.29 |
| 5-day biochemical oxygen demand | mg/L | 1599 | 363 | 77.30 |
| Soluble chemical oxygen demand | mg/L | 963 | 511 | 46.93 |
| Chemical oxygen demand | mg/L | 2614 | 590 | 77.42 |

The results presented in Tables 1 and 2 clearly show that the apparatus and the process of the present invention are effective for treating wastewater of various origins comprising various pollutants. It was therefore determined that the process and the apparatus of the invention make it possible to treat a wastewater in a simple way without relying on various chemical additives such as flocculating agents, and without having to rely on settling basins; clarifiers or complex mechanical means in order to separate the sludge from the treated water. In the apparatus and the processes of the invention, the sludge is separated from treated water in a simple and effective way. This step is also facilitated by the fact that the sludge is recovered just above the electrodes or in the vicinity thereof. Finally, the treatment may be carried out in a short period of time.

Although the present invention has been described by means of preferred embodiments, it is understood that many variations and modifications may be grafted to these specific embodiments, and the present invention aims at covering such modifications, uses or adaptations of the present invention following in general, the principles of the invention and including all variation of the present description which will become known or conventional in the field of activity in which the present invention is involved, and which may apply to the essential elements mentioned above, in accordance with the scope of the following claims.

The invention claimed is:

1. Apparatus for treating effluents comprising:
a reactor having an inlet for the effluent to be treated and an outlet for the treated effluent, and comprising at least one block of electrodes, the block having at least one anode and at least one cathode, the electrodes being disposed substantially parallel and spaced from one another, so as to define therebetween a space allowing the effluent to be treated to pass therethrough, thus producing, when the effluent to be treated is submitted to an electrical current, a sludge comprising at least one pollutant that is present in the effluent to be treated, and a treated effluent, the reactor also comprising means allowing the effluent to circulate between the electrodes in an upward direction; and
means allowing separation of the sludge produced from the treated effluent, said means being disposed immediately above said electrodes or in the vicinity thereof and comprises a movable belt to which the sludge produced adheres in order to be transported and separated from the treated effluent and a suction means connected to a recovery tank adapted to receive the sludge,
wherein the movable belt is a filtering belt.

2. Apparatus according to claim 1, wherein it permits the effluent to circulate between the electrodes so as to minimize turbulence, thereby promoting flotation of the sludge immediately above the electrodes or in the vicinity thereof.

3. Apparatus according to claim 1, wherein the reactor comprises means allowing the effluent to flow so as to minimize turbulence.

4. Apparatus according to claim 3, wherein said reactor has a bottom and wherein said at least one block of electrodes is raised with respect to said bottom so as to define an additional space that communicates with the space between the electrodes and to allow the effluent to be treated to circulate under said electrodes.

5. Apparatus according to claim 4, wherein said means allowing the effluent to circulate between the electrodes in an upward direction comprises a duct connecting the inlet of the reactor with said additional space, and wherein said means allowing the effluent to flow so as to minimize turbulence comprises a transition tank disposed downstream of the block of electrodes, and in communication with the latter, said transition tank allowing to collect the effluent that has been treated by the block of electrodes.

6. Apparatus for treating effluents comprising:
 a reactor having an inlet for the effluent to be treated and an outlet for the treated effluent, and comprising at least one block of electrodes, the block having at least one anode and at least one cathode, the electrodes being disposed substantially parallel and spaced from one another, so as to define therebetween a space allowing the effluent to be treated to pass therethrough, thus producing, when the effluent to be treated is submitted to an electrical current, a sludge comprising at least one pollutant that is present in the effluent to be treated, and a treated effluent, the reactor also comprising means allowing the effluent to circulate between the electrodes in an upward direction; and
 means allowing separation of the sludge produced from the treated effluent, said means being disposed immediately above said electrodes or in the vicinity thereof and comprises a movable belt to which the sludge produced adheres in order to be transported and separated from the treated effluent and a suction means connected to a recovery tank adapted to receive the sludge, wherein the reactor comprises a first block of electrodes, and a second block of electrodes disposed downstream of said first block of electrodes, wherein said means allowing the effluent to circulate between the electrodes in an upward direction comprises a first substantially vertical wall disposed upstream of said first block of electrodes and defining a lower pathway adapted to receive the effluent to be treated, wherein the reactor additionally comprises a feeding compartment upstream of said first wall, said feeding compartment being used to collect the effluent to be treated coming from a feeding tank, and wherein it comprises means allowing the effluent to flow so as to minimize turbulence.

7. Apparatus according to claim 6, wherein said blocks of electrodes are separated by a means allowing the effluent to circulate between the electrodes of the second block in an upward direction.

8. Apparatus according to claim 6, wherein the electrodes are disposed in a plane and the global displacement of the effluent in the reactor from the inlet up to the outlet is carried out perpendicularly to that plane.

9. Apparatus according to claim 1, wherein the reactor comprises a first block of electrodes, and a second block of electrodes disposed downstream of said first block of electrodes and wherein said means allowing the effluent to flow so as to minimize turbulence comprises a first transition tank disposed downstream of the first block of electrodes, and in communication with the latter, said first transition tank allowing to collect the effluent that has been treated with the first block of electrodes, and wherein it comprises a second transition tank disposed downstream of said second block of electrodes, and in communication with the latter, said second transition tank allowing to collect the effluent that has been treated with the second block of electrodes.

10. Apparatus according to claim 9, wherein the means allowing to separate the sludge produced from the treated effluent comprises a conveyor having a part disposed in said first transition tank, said conveyor comprising said filtering belt in movement, to which the sludge adheres so as to be carried and separated from the treated effluent, and wherein it further comprises another conveyor having a part disposed in said second transition tank, said conveyor comprising a filtering belt in movement to which the sludge adheres so as to be carried and separated from the treated effluent.

11. Apparatus according to claim 10, wherein the conveyors are in communication with a sludge collector comprising:
 said recovery tank allowing to recover the sludge and having a framework provided with an inlet and an outlet to drain the sludge; and
 a suction means connected by means of a duct to the recovery tank allowing to run the sludge from said inlet up to the inside of said framework and to clean said filtering belts.

12. Apparatus according to claim 1, wherein the electrodes of at least one block of electrodes comprise aluminum, calcium or iron.

13. Apparatus according to claim 1, wherein the electrodes of at least one block of electrodes are inert electrodes.

14. Apparatus according to claim 1, wherein the electrodes comprise at least one anode including a source of $Ca^{2+}$.

15. Apparatus according to claim 4, wherein said at least one block of electrodes is mounted on a support that removably rests on the bottom of said reactor and allows the effluent to be treated to run through the additional space.

16. Apparatus according to claim 6, wherein the movable belt is a filtering belt.

17. Apparatus according to claim 3, wherein said apparatus comprises two blocks of electrodes, a first block adapted to treat said effluent by electrocoagulation and a second block adapted to treat said effluent by electroflotation.

18. Apparatus for treating effluents comprising:
 a reactor having an inlet for the effluent to be treated and an outlet for the treated effluent, and comprising two blocks of electrodes, a first block adapted to treat said effluent by electrocoagulation and a second block, disposed downstream of said first block, adapted to treat said effluent by electroflotation, the blocks having at least one anode and at least one cathode, the electrodes being disposed in a plane and the global displacement of the effluent in the reactor from the inlet up to the outlet is carried out perpendicularly to that plane, the electrodes being disposed substantially parallel and spaced from one another, so as to define therebetween a space allowing the effluent to be treated to pass therethrough, thus producing, when the effluent to be treated is submitted to an electrical current, a sludge comprising at least one pollutant that is present in the effluent to be treated, and a treated effluent, the reactor also comprising means allowing the effluent to circulate between the electrodes in an upward direction and means allowing the effluent to flow so as to minimize turbulence, said means allowing the effluent to flow so as to minimize turbulence comprises a first transition tank disposed downstream of the first block of electrodes, and in communication with the latter, said first transition tank allowing to collect the effluent that has been treated with the first block of electrodes, and wherein it comprises a second transition tank disposed downstream of said second block of electrodes, and in communication with the latter, said second transition tank allowing to collect the effluent that has been treated with the second block of electrodes; and means allowing separation of the sludge produced from the treated effluent, wherein said means is located immediately above the electrodes or in the vicinity thereof, this means comprising a conveyor having a part disposed in said first transition tank, said conveyor comprising a filtering belt in movement, to which the sludge adheres so as to be carried and separated from the treated effluent, and wherein it comprises another conveyor having a part disposed in said second transition tank, said conveyor comprising a filtering belt in movement to which the sludge adheres so as to be carried and separated from the treated effluent.

19. Apparatus according to claim 18, wherein said reactor has a bottom and wherein said blocks of electrodes are raised with respect to said bottom so as to define an additional space that communicates with the space between the electrodes and to allow the effluent to be treated to circulate under said electrodes.

20. Apparatus according to claim 19, wherein said means allowing the effluent to circulate between the electrodes in an upward direction comprises a duct connecting the inlet of the reactor with said additional space.

21. Apparatus according to claim 18, wherein said means allowing separation of the sludge produced from the treated effluent comprises a suction means connected to a recovery tank adapted to receive the sludge.

22. Apparatus according to claim 21, wherein the conveyors are in communication with a sludge collector comprising:

said recovery tank allowing to recover the sludge and having a framework provided with an inlet and an outlet to drain the sludge; and a suction means connected by means of a duct to the recovery tank allowing to run the sludge from said inlet up to the inside of said framework and to clean said filtering belts.

* * * * *